(12) United States Patent
Rose

(10) Patent No.: US 7,066,592 B2
(45) Date of Patent: *Jun. 27, 2006

(54) FRAMELESS GLASSES ATTACHING TO BODY

(76) Inventor: John Rose, 470-505 Wingfield Rd., Susanville, CA (US) 96130

( * ) Notice: Subject to any disclaimer, the term of this patent is extended or adjusted under 35 U.S.C. 154(b) by 0 days.

This patent is subject to a terminal disclaimer.

(21) Appl. No.: 10/982,159

(22) Filed: Nov. 4, 2004

(65) Prior Publication Data

US 2005/0122467 A1 Jun. 9, 2005

Related U.S. Application Data

(60) Provisional application No. 60/519,003, filed on Nov. 8, 2003.

(51) Int. Cl.
*G02C 1/00* (2006.01)

(52) U.S. Cl. .................. 351/41; 351/124; 351/158

(58) Field of Classification Search .................. 351/41, 351/111, 158, 70, 65, 124, 140, 143
See application file for complete search history.

(56) References Cited

U.S. PATENT DOCUMENTS

| | | | |
|---|---|---|---|
| 1,749,676 A | 3/1930 | Sadler et al. | |
| 2,926,563 A | 3/1960 | Lockwood | |
| 3,010,365 A | 11/1961 | Sadel | |
| 3,701,593 A | 10/1972 | Fernandez | |
| 3,758,202 A | 9/1973 | Chunga, Sr. | |
| 4,006,974 A * | 2/1977 | Resnick | 351/59 |
| 4,179,756 A | 12/1979 | Lucas | |
| 4,868,929 A | 9/1989 | Curcio | |
| 4,886,349 A * | 12/1989 | Willis | 351/111 |
| 4,893,919 A | 1/1990 | Nightingale | |
| 4,974,955 A | 12/1990 | Treadway, Sr. | |
| 4,984,879 A | 1/1991 | Plunkett | |
| 5,007,905 A | 4/1991 | Beuer | |
| 5,559,566 A | 9/1996 | Hansman | |
| 5,638,144 A | 6/1997 | Vakavtchiev | |
| 5,675,988 A | 10/1997 | Ignatowski | |
| 5,711,949 A | 1/1998 | Balassyano | |
| 5,719,655 A | 2/1998 | Peschel et al. | |
| 5,818,566 A | 10/1998 | Carlon et al. | |
| 5,880,811 A | 3/1999 | Parisi | |
| 6,283,594 B1 | 9/2001 | Hamano | |
| 6,296,355 B1 | 10/2001 | Rittmann | |
| 6,557,994 B1 * | 5/2003 | Rose | 351/41 |

\* cited by examiner

*Primary Examiner*—Hung Xuan Dang
(74) *Attorney, Agent, or Firm*—Klarquist Sparkman, LLP

(57) ABSTRACT

A frameless glassware assembly attaching to boy piercing studs or similar structures attached to the human boy. One disclosed design consists of an elastomeric C-clip fixedly attached to one distal end of a metal arm, which is attached to a frameless glass lens assembly. This design allows for frameless eyeglass attachment to eyebrow studs, the nose studs of a user, or similar structure via one or more elastomeric C-clips. One embodiment allows the frameless glassware to attach to eyebrow studs and the second allows the frameless glassware to attach to a nose stud. Both of these designs are frameless and avoid side wire or similar earpieces common to hold glassware to the face of a user.

7 Claims, 11 Drawing Sheets

FRAMELESS GLASSES ATTACHING TO BODY

CROSS REFERENCE TO RELATED APPLICATIONS

This application claims priority through, and hereby expressly incorporates by reference, the common applicant's prior U.S. provisional patent application, Ser. No. 60/519, 003, filed Nov. 8, 2003, entitled FRAMELESS GLASSES ATTACHING TO BODY.

BACKGROUND OF THE INVENTION

1. Field of the Invention

The present invention relates generally to eye glass wear and, more specifically, to glasses having members for attachment to body piercing studs.

The present invention is frameless eyeglasses having elastomeric c-clip members that selectively attach to eyebrow studs and/or nose bridge studs.

The preferred embodiments of the present invention are provided in two designs. The first design, attaches to eyebrow studs and consists of a flexible elastomeric C-clip fixedly attached to one distal end of a metal arm, which is attached to the frameless glass lens by means of a threaded bolt, two washers, and a nut. The lenses are coupled together by a one piece bridge and nose rest fixedly attached to the lens by a screw, two washers and a nut.

The second design attaches to a nose bridge stud also by means of a flexible elastomeric C-clip fixedly attached to one distal end of a frameless eyeglass lens by means of a screw, two washers and a nut and clipped to the distal end of a nose bridge stud. Both designs are frameless and are void of ear pieces side wires commonly used to hold the eyewear to the face.

2. Description of the Prior Art

There are other sunglasses retaining devices designed for holding the positioning of sunglasses. Typical of these is U.S. Pat. No. 1,749,676 issued to Sadler et al. on Mar. 4, 1930.

Another patent was issued to Styll on May 6, 1941 as U.S. Pat. No. 2,240,725. Yet another U.S. Pat. No. 2,926,563 was issued to Lockwood on Mar. 1, 1960 and still yet another was issued on Nov. 29, 1961 to Sadel as U.S. Pat. No. 3,010,365.

Another patent was issued to Fernandez on Oct. 31, 1972 as U.S. Pat. No. 3,701,592. Yet another U.S. Pat. No. 3,758,202 was issued to Chunga, Sr., on Sep. 11, 1973. Another was issued to Treadway, Sr., on Dec. 4, 1990 as U.S. Pat. No. 4,974,955 and still yet another was issued on Oct. 14, 1997 to Ignatowski as U.S. Pat. No. 5,675,988

Another patent was issued to Peschel et al. on Feb. 17, 1998 as U.S. Pat. No. 5,719,655. Yet another U.S. Pat. No. 5,818,566 was issued to Carlon et al., on Oct. 6, 1998. Another was issued to Hamano on Sep. 4, 2001 as U.S. Pat. No. 6,283,594 and still yet another was issued on Oct. 2, 2001 to Rittmann as U.S. Pat. No. 6,296,355.

U.S. Patent No. 1,749,676 Inventor: Frederick W. Sadler et al. Issued Mar. 4, 1930

The invention is a means by which the shades may be readily secured to goggles and also spectacles. The shades may be readily adjusted in to a position or position which will afford the maximum protection for the eyes, the shades being adapted to be adjusted to position them above or at one side or in front of the glasses and being adapted in any adjusted position thereof to occupy any angular position with respect to the glasses.

U.S. Pat. No. 2,240,725 Inventor: Harry H. Styll Issued: May 6, 1941

The invention is a means of forming an ophthalmic mounting having its lens supporting means positioned above the useful field of vision and having a substantially rigid construction between the bridge and temple supporting portions thereof to which the lenses are attached and supported substantially free from shock and strain during the use of the mounting.

U.S. Pat. No. 2,926,563 Inventor: Lee John Lockwood Issued: Mar. 1, 1960

The invention is a clip-on sunglass mounting which is purportedly highly reliable in operation throughout long periods of use, and which will maintain a substantially uniform and not abnormal spring pressure for clipping and securely maintaining the sunglasses in place. The vertical axes of the sunglass lenses are held in exact parallel position when spread apart and clipped onto ordinary glasses of spectacles, without the necessity of bending any parts of the frame out of shape. The invention allows the driver of an automobile to both grasp and mount the sunglasses with one hand, while controlling the steering wheel with the other.

U.S. Pat. No. 3,010,365 Inventor: Leo Sadel Issued: Nov. 28, 1961

The invention provides holder members in the form of clips, which may be releasably attached to an eyeglass frame and arranged to engage the cars of the wearer to maintain the eyeglasses in position on the head of the wearer. Associated with each ear piece is a lobe-encircling holder member which is adapted to curve around and above the lobule or fleshy ear lobe of the wearer, and which has a resilient tip formed to hook back on and engage the anti-tragus, the protruding cartilaginous shelf above the lobule from which the latter depends.

U.S. Pat. No. 3,701,592 Inventor: Jose J. Fernandez Issued: Oct. 31, 1972

A pair of spectacles provided with a nose bridge specifically contoured to conform to the upper nose of the wearer with a central portion of the bridge made from plastic or metal alloy material including a U-shaped cavity forming a vacuum around a portion of the nose retaining the spectacles in their normal position. The spectacles are attached by modest pressure at the bridge without the deforming permanent pressure of the pincenez type bridge without the well known ear bows.

U.S. Pat. No. 3,758,202 Inventor: Lorenzo Chunga, Sr. Issued: Sep. 11, 1973

Eyeglass frames for supporting lenses adjacent the eyes of the wearer consisting of a plurality of supporting members, having their longitudinal axes disposed vertically with respect to the face of the wearer, mounted on the upper and lower edges of the lenses. The members engage the skin adjacent the eye socket of the individual wearing the glasses and provide a movable support for the lenses adjacent the eye of the user. If desired, the frames may also include a nose bridge member to furnish additional support on the nose of the wearer. The support members are secured to the face of the wearer by adhesive means disposed on the ends of the support members, and are slidably engaged on the edges of the lenses so as to be adjustable during use.

U.S. Pat. No. 4,974,955 Inventor: James E. Treadaway, Sr. Issued; Dec. 4, 1990

This invention relates to an eyeglass/sunglass snuggling device which attaches to the temple piece of glasses. It also is designed to accept a decorative pendant which is removable when it is undesirable to wear. The device can be detached from the temple piece and worn separately if so desired. The invention comprises tubing; a deformable material to provide better fit around the ear; and, a detachable pendant which is held by a chain.

U.S. Pat. No. 5,675,988 Inventor: Patricia M. Ignatowski
Issued: Oct. 14, 1997

A jewelry article is adapted for attachment as an extension of the temple arm on conventional eyeglasses. The jewelry extension, or "glasstension", grips the temple arm with an elastic loop potion of a gripping member, and the gripping member in turn supports one or more elongated strands of jewelry type decorations, such as beads and charms. Each glasstension is a unitary piece, with the elongated decorative strands being securely affixed onto the gripping member.

U.S. Pat. No. 5,719,655 Inventor: David K. Peschel
Issued: Feb. 17, 1998

In one aspect of the invention a templeless system of eyewear is provided for securing the eyewear to the head of a person. The eyewear has a lens assembly with a first coupling element secured to the lens assembly. A second coupling element is secured to the head of a person. The lens assembly is attached to the head of the person by attaching the first and second coupling elements. In another aspect of the invention, the first coupling element is a magnet and the second coupling element is a magnetically attractable member. The magnet attracts the magnetically attractable member, thus securing the lens assembly to the person's head. In yet another aspect to the invention, the first coupling element is a magnetically attractable member and the second coupling element is a magnet. In another aspect of the invention, a device is provided for magnetically coupling sportswear, such as eyewear, to a person. The device has an adhesive backing material for attaching the device to the person, with a flexible covering on top of the adhesive backing material. Sandwiched between the backing material and the flexible covering is a magnet. After the device is coupled to the person, the magnet in the device can thereafter be used to magnetically couple a piece of sports equipment to the person.

U.S. Pat. No. 5,818,566 Inventor: Roberto Carlon et al.
Issued: Oct. 6, 1998

A structure for rimless spectacles of the type fashioned from wire where the shafts are attached on either side to static hinge mounts, likewise in wire, each anchored by two parallel shanks with portions bent outward from the lenses and affording pairs of coils aligned with the points of anchorage; and where the bridge and nosepiece support is in one piece and exhibits an upturned-U profile with splayed members formed into a loop at bottom and redirected upwards, each terminating in a fork of which the pins are inserted obliquely through the relative lens and anchored in an interference fit; alternatively, each upwardly directed end can be bent sideways at 90. degrees to form an angled portion accommodated partly by a groove machined in the lens and terminating in a single pin, again inserted obliquely through the lens; and further where the lens presents a peripheral channel in which to seat elastically deformable ring.

U.S. Pat. No. 6,283,594 Inventor: Miles M. Hanano
Issued: Sep. 4, 2001

A grip device to prevent eyeglass having a bridge piece from slipping downwardly on the nose over time. The device comprises two mutually removable attachment components, one fixed to the rear surface of the bridge piece of the eyeglasses, and the other fixed to the bridge of the nose of a person. Each attachment components mutually attach employing removable connector material. In alternative embodiments, this connector material is magnetic materials, or alternatively comprises hook and loop fastener. The two attachment components are small and inconspicuous. The attachment component which is adhered to the face is flesh colored.

U.S. Pat. No. 6,296,355 Inventor: Jean V. Rittmann
Issued: Oct 2, 2001

This invention is a mechanical method of constructing eyewear, without brazing. An eyewear frame is formed by a continuous, bent, spring wire. Sidepiece 47 is fixedly attached to frame endpiece parts 30 and 31 by mating a bent portion of each within compression spring 40. The Vertically tall, transversely thin sidepieces san support with scant lateral pressure to a wearer's head, and can close against the frame without hinges. The length of a spring over the endpiece confines lens 56 in upper and lower portions of a frame's eyewire. Lens 55 has been removed by laterally compressing spring 40 around the folded-over endpiece parts and letting the ends of the endpiece parts spread vertically apart. Elongated members, unrelated to eyewear endpieces and sidepieces, can be fixedly attached and removed, and/or spread in the ways as described above. A nose bridge can be formed by a continuous, bent, spring wire. Its transversely elongated bridge portion 20 adds strength and stability to the frame. Hook 22 at an upper lateral end of the bridge portion plus a bridge portion frontward bow substantially mechanically encircles the frame's bridge in the latitudinal/longitudinal plane. The hooks and bow hold together upper and lower medical portions of a frame's eyewire. The vertical stability of the lenses, supported in the frame's eyewires, keeps the nose bridge from rotating. Nose bridge hook 22 continues downwardly/rearwardly as nose pad arm 60. The lateral angling of the arms also keeps the nose bridge from rotating. Each wire end of the arms upwardly loop; each loop can secure a nose pad ball joint.

BRIEF SUMMARY OF THE PRESENT INVENTION

While these previously described decorative eyeglasses may be suitable for the purposes for which they were designed, they would not be as suitable for the purposes of the present invention, as hereinafter described. The present invention comprises frameless eyeglasses having attachment members that attach the frameless eyeglasses to an eyebrow stud, nose bridge stud, or similar structure secured attached to the human body.

In one respect, certain embodiments of the present invention may provide a glass to eyebrow stud, (GES) and attaches to an eyebrow stud and consists of a flexible elastomeric C-clip fixedly attached to one distal end of a metal arm which is attached to the frameless glass lens by means of a threaded bolt, two washers and a nut. The lenses are coupled together by a one-piece bridge and nose rest fixedly attached to the lens by fasteners.

In a second aspect, certain embodiments of the present invention may attach to a nose bridge stud also by means of a flexible elastomeric C-clip fixedly attached to one distal end of a frameless eyeglass lens by means of fasteners and clipped to the distal end of a nose bridge stud.

The present invention may therefore provide frameless eyeglasses having one or more elastomeric or other attachment members that selectively attach to, and detach from, an eyebrow stud, nose bridge stud, or similar structure attached to the human body.

One advantage of certain embodiments is that the invention can provide eyeglasses with reduced bulk, which can render them easier to manufacture, transport, assemble, ship, and use.

In some embodiments, the resulting eyeglasses are economical and lightweight.

Other aspects and advantages of this invention or various embodiments of it will appear from the following description and appended claims, reference being made to the accompanying drawings forming a part of this specification wherein like reference characters designate corresponding parts in the several views.

Certain eyeglasses of the present invention are provided in two designs. The first design, glass to eyebrow stud (GES), attaches to an eyebrow stud and consists of a flexible elastomeric C-clip fixedly attached to one distal end of a metal arm, which is attached to the frameless glass lens by means of fasteners. The lenses are coupled together by a one piece bridge and nose rest fixedly attached to the lens by fasteners.

A second design, a glass to nose bridge (GNB) attaches to a nose bridge stud also by means of a flexible elastomeric C-clip fixedly attached to one distal end of a frameless eyeglass lens by means of fasteners and clipped to the nose bridge stud. Both designs are frameless and are void of side wire common to ear pieces to hold the eye wear to ones face.

The foregoing and other aspects, objects, and advantages of the invention or various embodiments will appear from the description to follow. In the description reference is made to the accompanying drawings, which forms a part hereof, and in which is shown by way of illustration of specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar part throughout the several views.

The following detailed description is, therefore, not to be taken in a limiting sense.

BRIEF DESCRIPTION OF THE DRAWING FIGURES

The preferred embodiments are shown in the accompanying drawings in which.

DESCRIPTION OF THE REFERENCED NUMERALS

Figure 1:
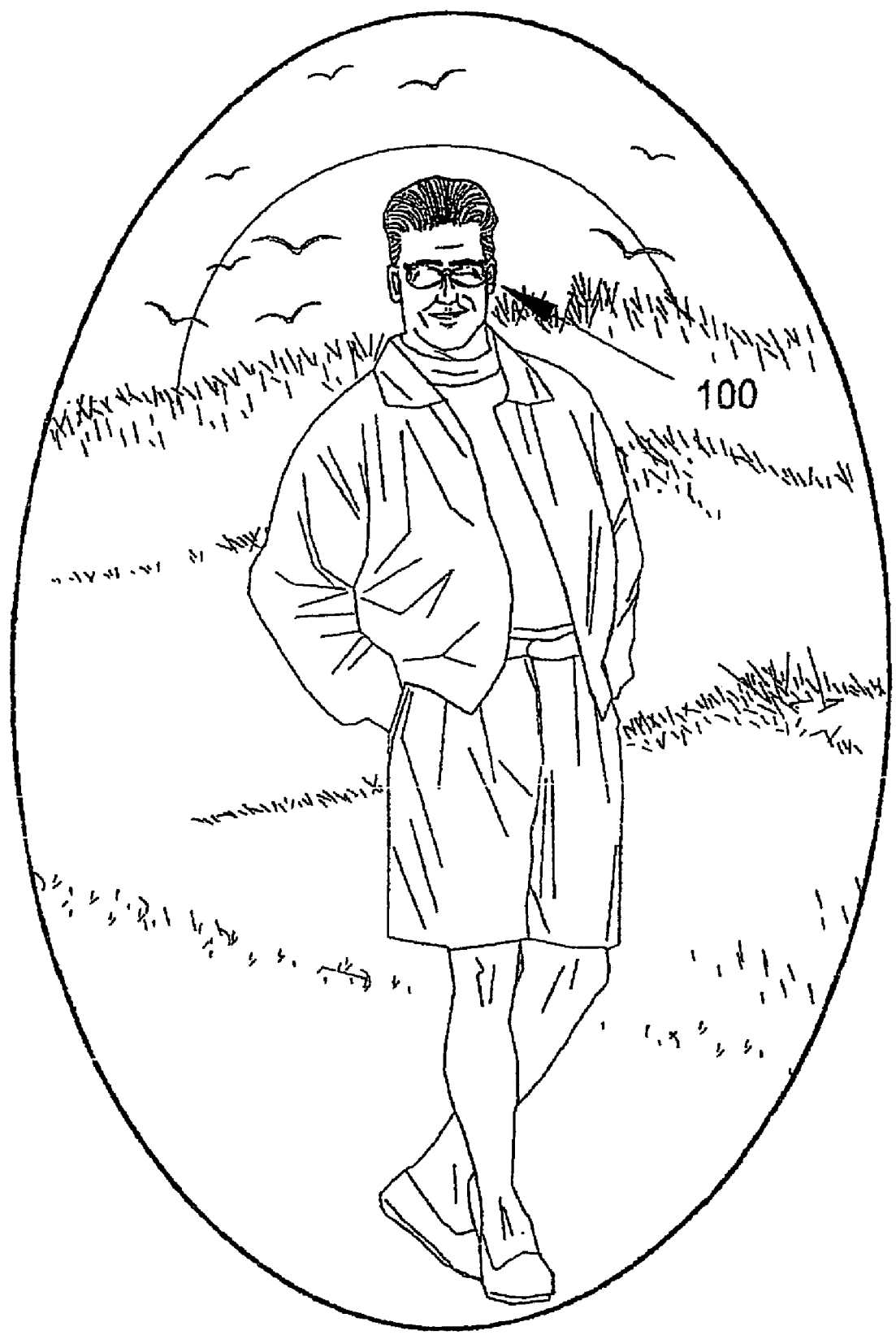
FIG. 1 is an illustrative view of the GES design in use by an individual, the prime embodiment of the present invention.

Turning now descriptively to the drawings, in which similar reference note similar elements throughout the several views, the figures illustrate embodiments of the present invention. With regard to the reference numerals used, the following numbering is used throughout the various drawing figures.

100 glass to eyebrow stud (GES) design
200 glass to nose bridge (GNB) design
300 glass to close eyebrow stud (GCES) design
10 bridge
11 lens
12 nose rest
13 eyebrow stud
14 flexible rubber clip insert
15 metal arm
16 metal arm attach assembly
17 bridge attach assembly
18 bridge extension arms
19 washer
20 screw
21 nut
22 metal arm internal dimple
23 nose stud screw
24 pierced nose bridge stud
25 short bridge

DETAILED DESCRIPTION OF THE PREFERRED EMBODIMENT

The following discussion describes in detail embodiments of the invention and variations of that embodiment. This discussion should not be construed, however, as limiting the invention to those particular embodiments, practitioners skilled in the art will recognize numerous other embodiments as well.

FIG. 1 is an illustrative view of the GES 100 design in use by an individual, the prime embodiment of the present invention. In GES 100 design, frameless glasses are fixedly attached to piercing studs within the eyebrow of the intended user wherein the GNB design 200 is such that the frameless glasses are fixedly attached to the bridge of a nose stud of the intended user. At a distance, such as seen in FIG. 1, it would not be easily determinable which design the user employs. In each design, the frameless glasses are easily attached or detached from the stud or nose bridge.

Figure 2:
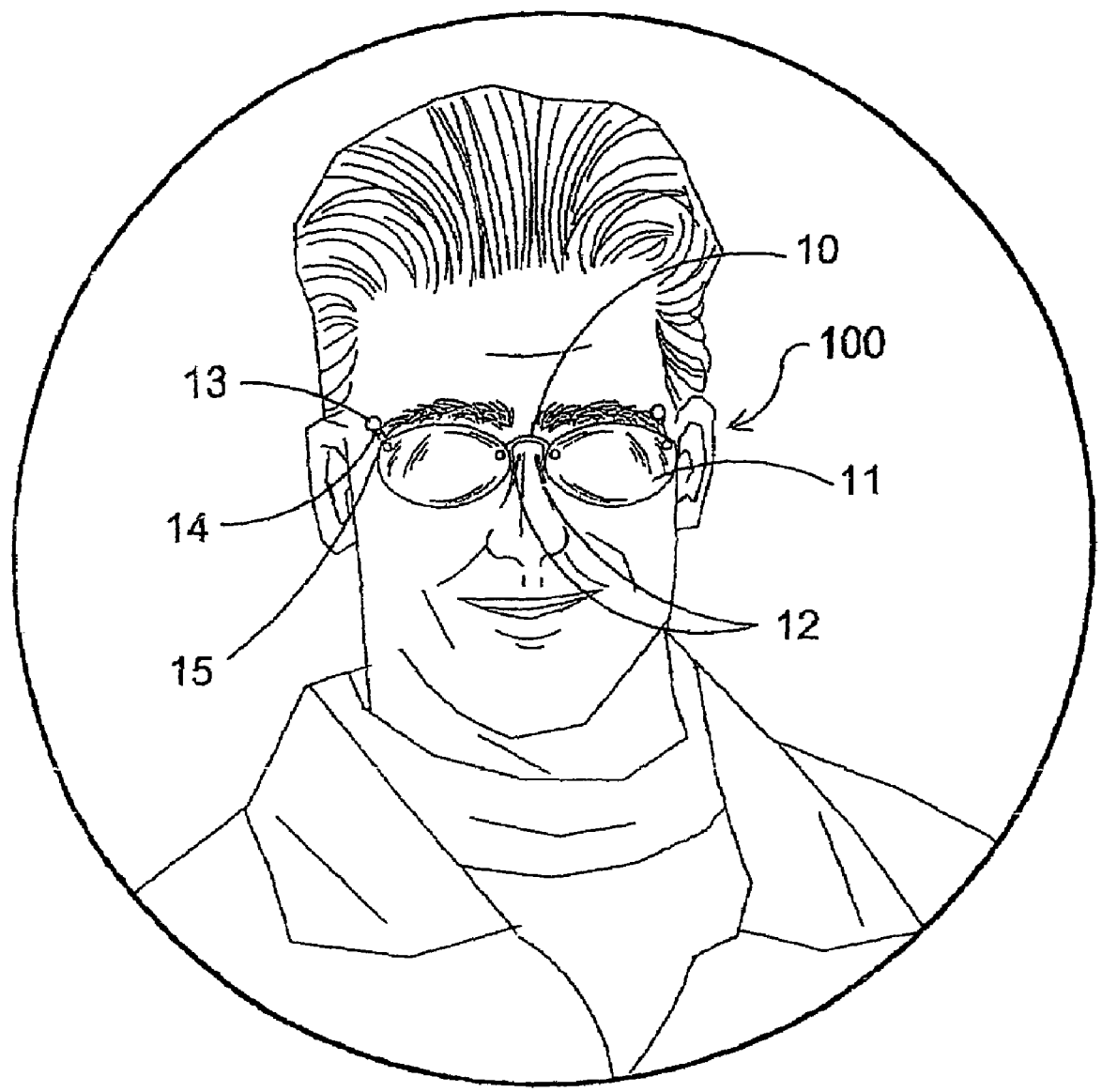
FIG. 2 is a close up illustrative view of the GES design in use.

FIG. 2 is a close up illustrative view of GES 100 in use. GES 100 is designed to attach to pierced eyebrow studs. Each lens 11 is attached to bridge 10 via a screw 20, washers 19, and nut 21 (or other means). Nose rests 12 are attached to leg extensions of bridge 10 and supply comfort in user wear. Metal arm 15 is attached at each end of each outer lens 11 via a screw 20, two washers 19, and a nut 21 (see FIG. 4 for detail). It should be noted that the attachment of metal arm 15 to lens 11 could be accomplished by means other than a screw 20/nut 21 combination. For example, a rivet or other means could accomplish the same functional result. Flexible rubber clip insert 14 has an elastomeric C-shaped tip fixedly attached to one distal end for attachment to eyebrow stud 13. Further detail will be illustrated in FIGS. 3 and 4.

Figure 3:
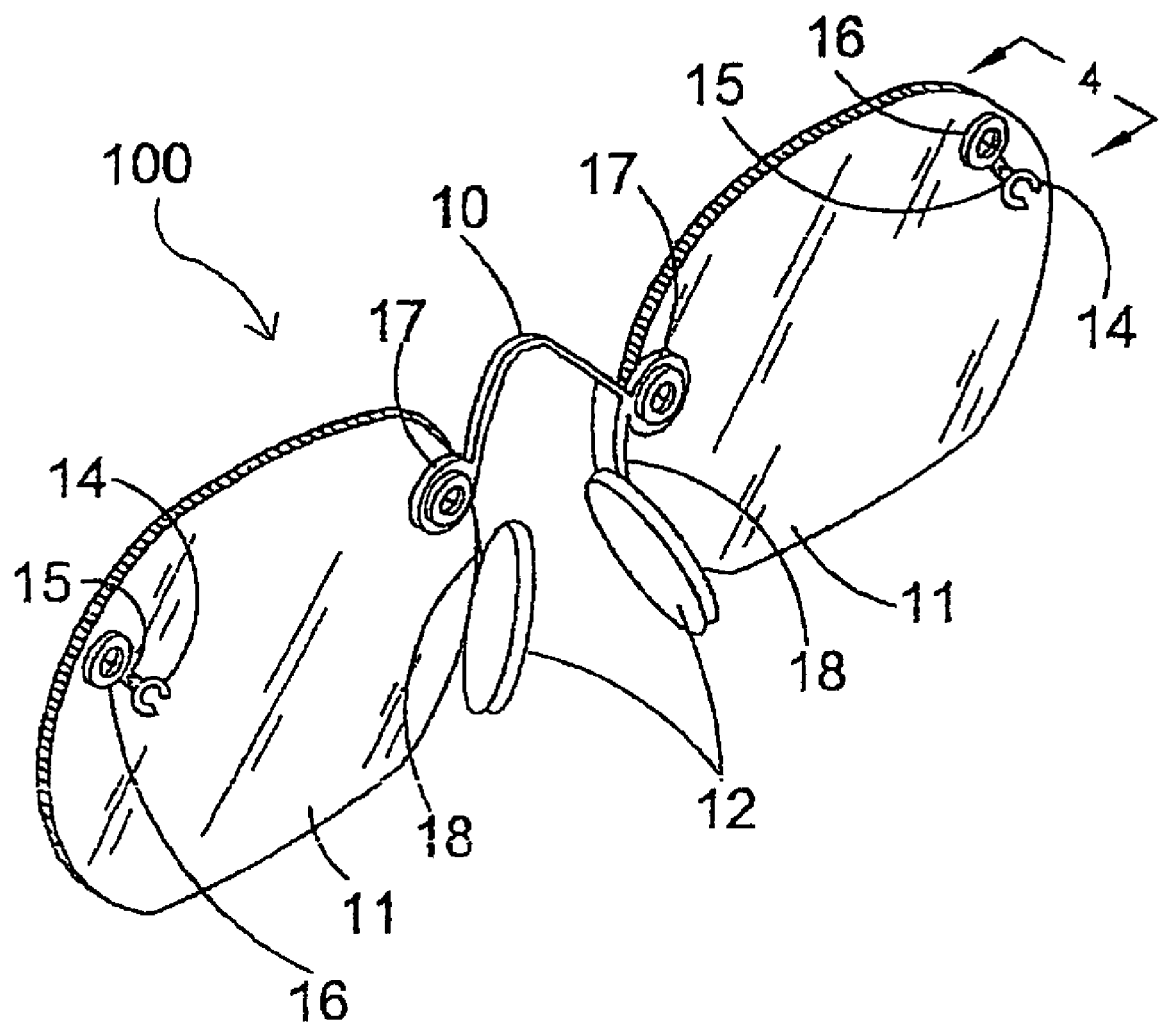
FIG. 3 is a top perspective view of the GES design.

FIG. 3 is a top perspective view of GES 100 design for attachment to user eyebrow pierced studs. GES 100 attaches to the eyebrow stud (not shown) via flexible rubber (elastomeric) C-clips 14 which are fixedly attached to each distal end of each metal arm 15. Each metal arm 15 is attached to each frameless lens 11 by means of metal arm attach assemble 16 which consist of a treaded bolt, two washers 19, and a nut 21. Bridge 10 attaches to each lens 11 via a bridge attach assembly 17, which is similar to metal arm attach assembly 16 (threaded bolt, two washers, and a nut). Bridge 10 employs bridge extension arms 18 on each side to accommodate nose rest 12 attachments. It should be noted that lens 11 could be made of various materials and can be prescription or non-prescription type lens. Lens 11 could be of various shades for sun protection, eye safety protection, night driving, etc.

Figure 4:
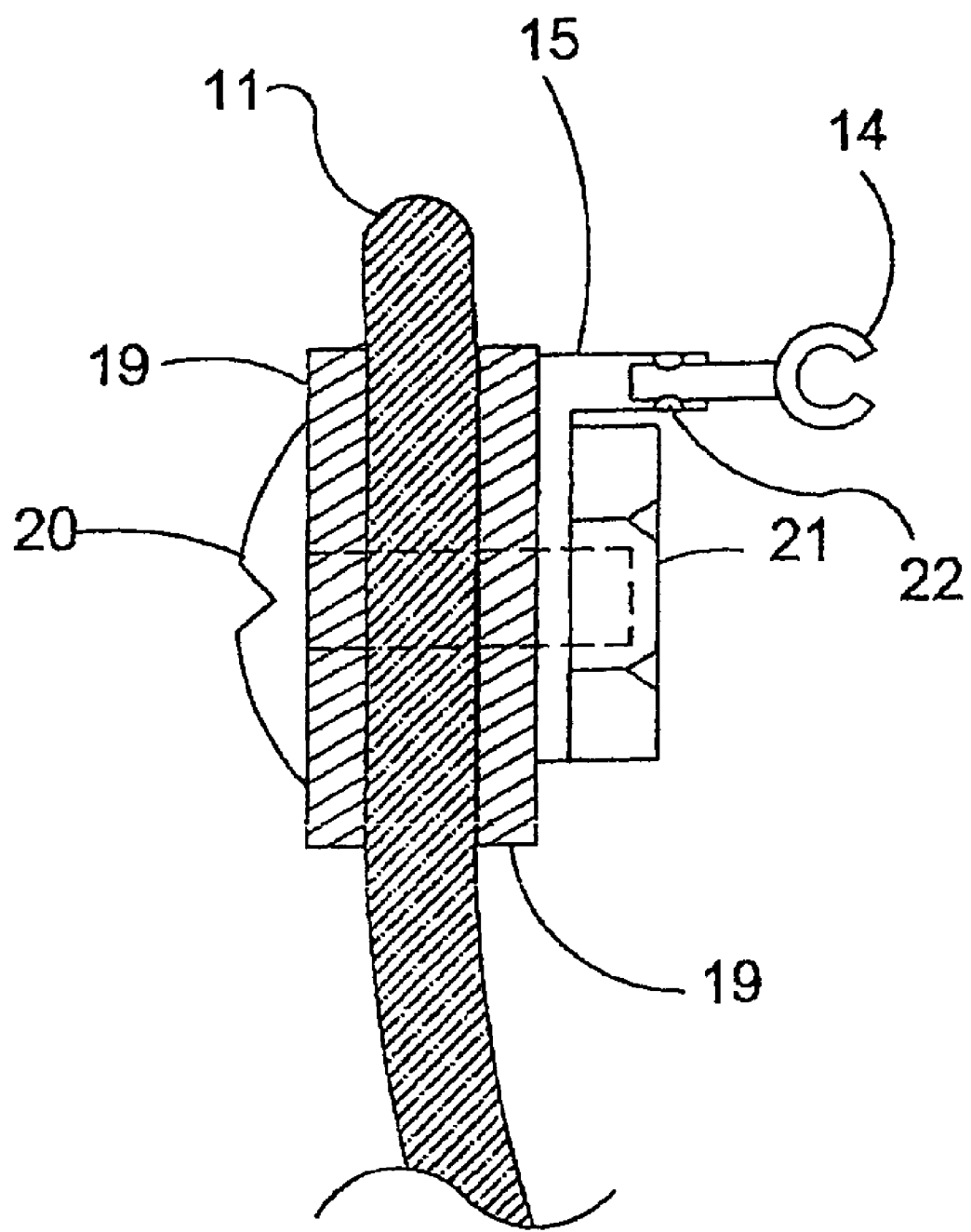
FIG. 4 is a sectional end view of the GES design showing the eyebrow stud attachment end of the GES.

FIG. 4 is a sectional end view of GES 100 design showing the eyebrow stud attachment end of the GES 100. Shown is frameless lens 11 attachment to metal arm 15 by means of screw 20, and washer 19 on each side of lens 11, and fastening nut 21. Flexible rubber clip insert 14 attaches to one distal end metal arm 15. Metal arm 15 employs metal arm internal dimple 22 to hold flexible rubber clip insert 14 in place. Flexible rubber clip insert 14 attaches to an eyebrow stud (not shown) via its elastomeric C-shaped tip fixedly attached to one distal end. It should be noted that the assembly of metal arm 15 to lens 11 could be accomplished by alternate means (not shown) such as a rivet or compression type pin, etc.

Figure 5:
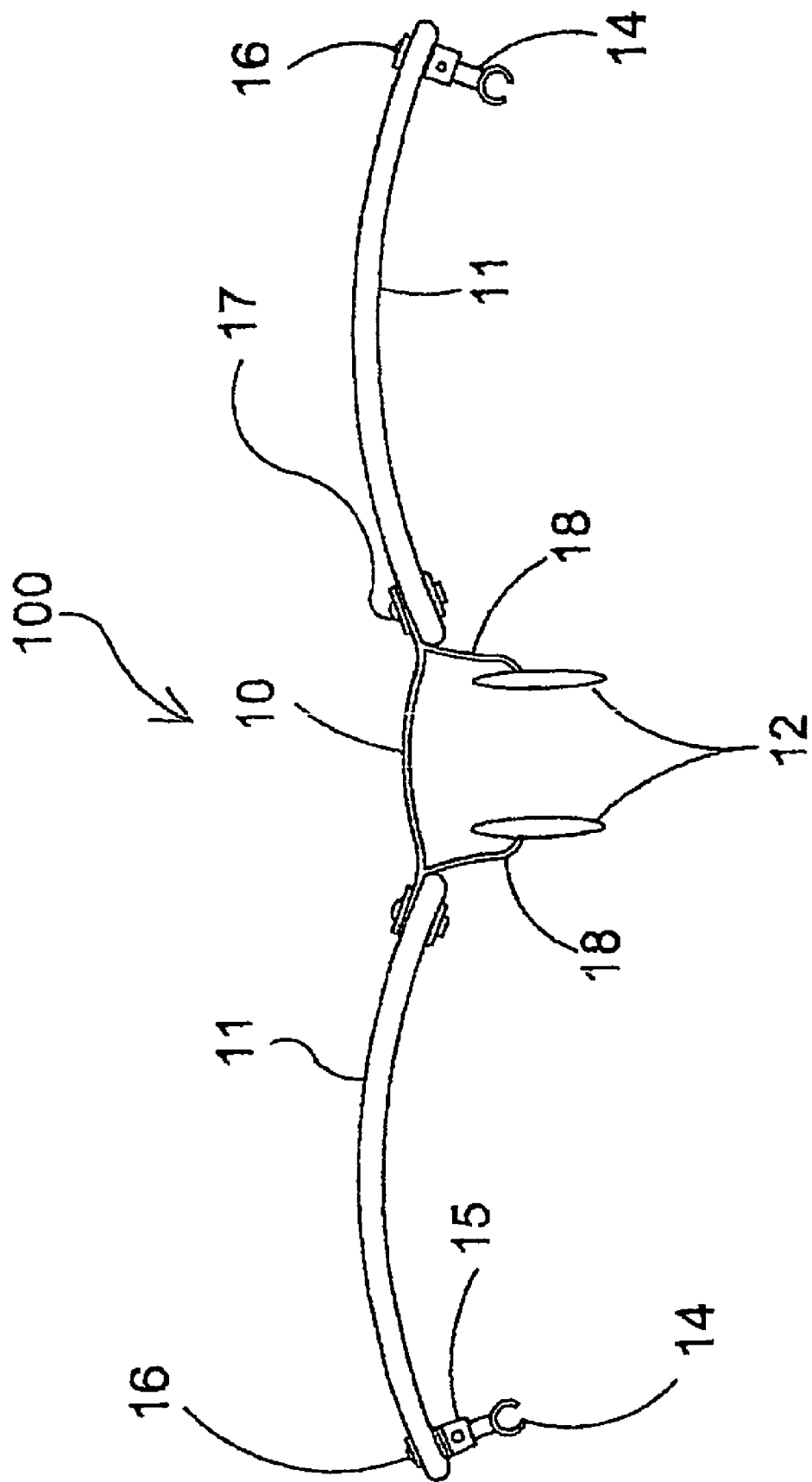
FIG. 5 is a top view of the GES design.

FIG. 5 is a top view of the GES 100 design. Shown are the frameless glass lenses 11, that attach to a users pierced eyebrow studs by means of flexible elastomeric C-clip 14, which is fixedly positioned to distal end of each metal arm 15. Metal arm 15 is attached to the frameless glass lens 11 by means of metal arm attach assembly 16 which consists of a threaded bolt, two washers 19, and a nut 21. Also shown in FIG. 5 top view is bridge 10 with bridge extension arms 18 to attach nose rest 12. Bridge 10 assemblies to each lens 11 by means of bridge attach assembly 17.

Figure 6:
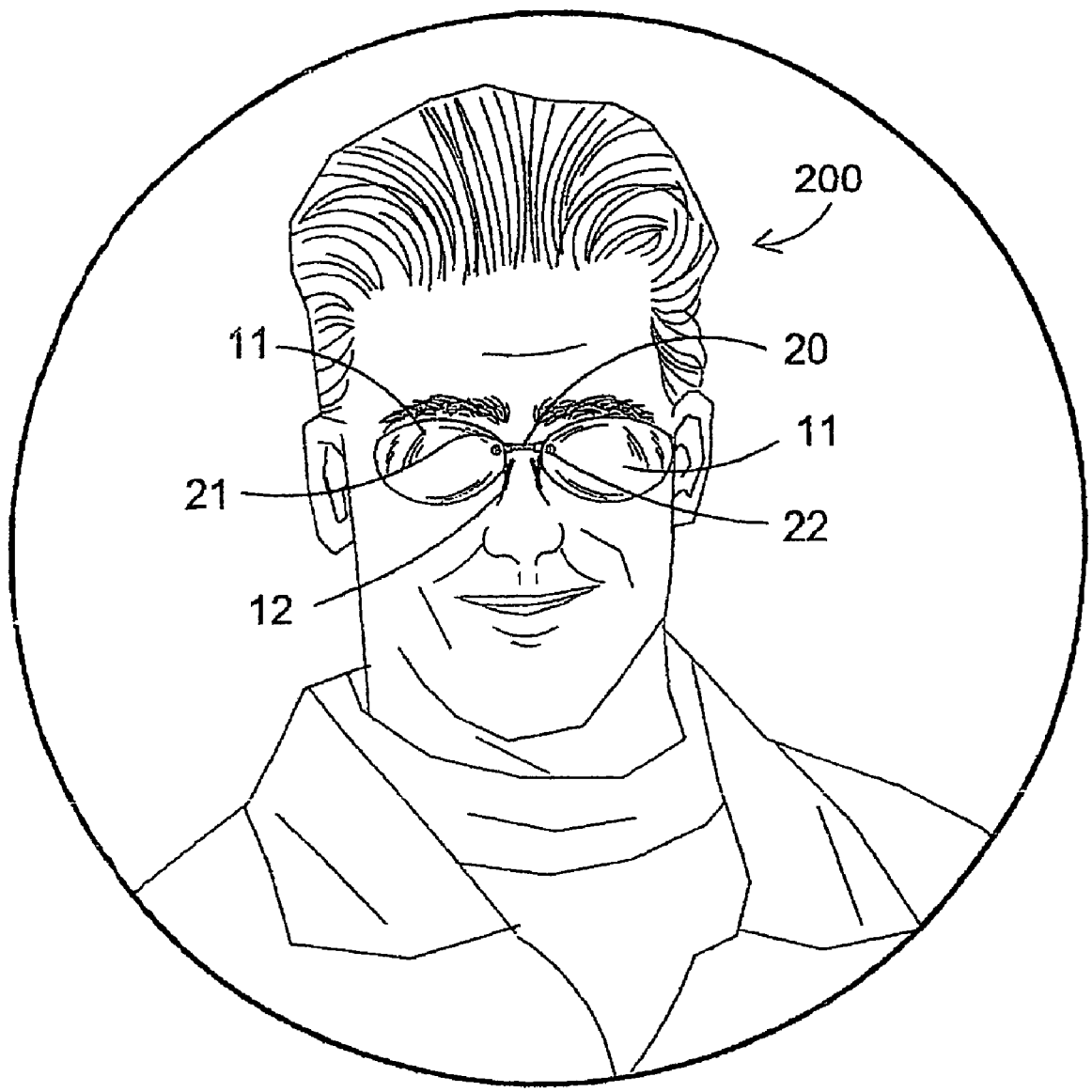
FIG. 6 is a front view of the GNB design attached to an individual for use with a pierced nose bridge, an alternative embodiment of the present invention.

FIG. 6 is a front view of the GNB 200 design attached to an individual for use with a pierced nose bridge stud 24, an alternate embodiment of the present invention. Shown is each frameless glass lens 11, flexible rubber clip 14, flexible rubber clip assembly 22, which consists of a screw 20, washers 19, and a nut 21, and nose rests 12. GNB 200 attaches to pierced nose bridge stud 24 by means of a flexible elastomeric C-clip fixedly positioned to one distal end of flexible rubber clip 14.

Figure 7:
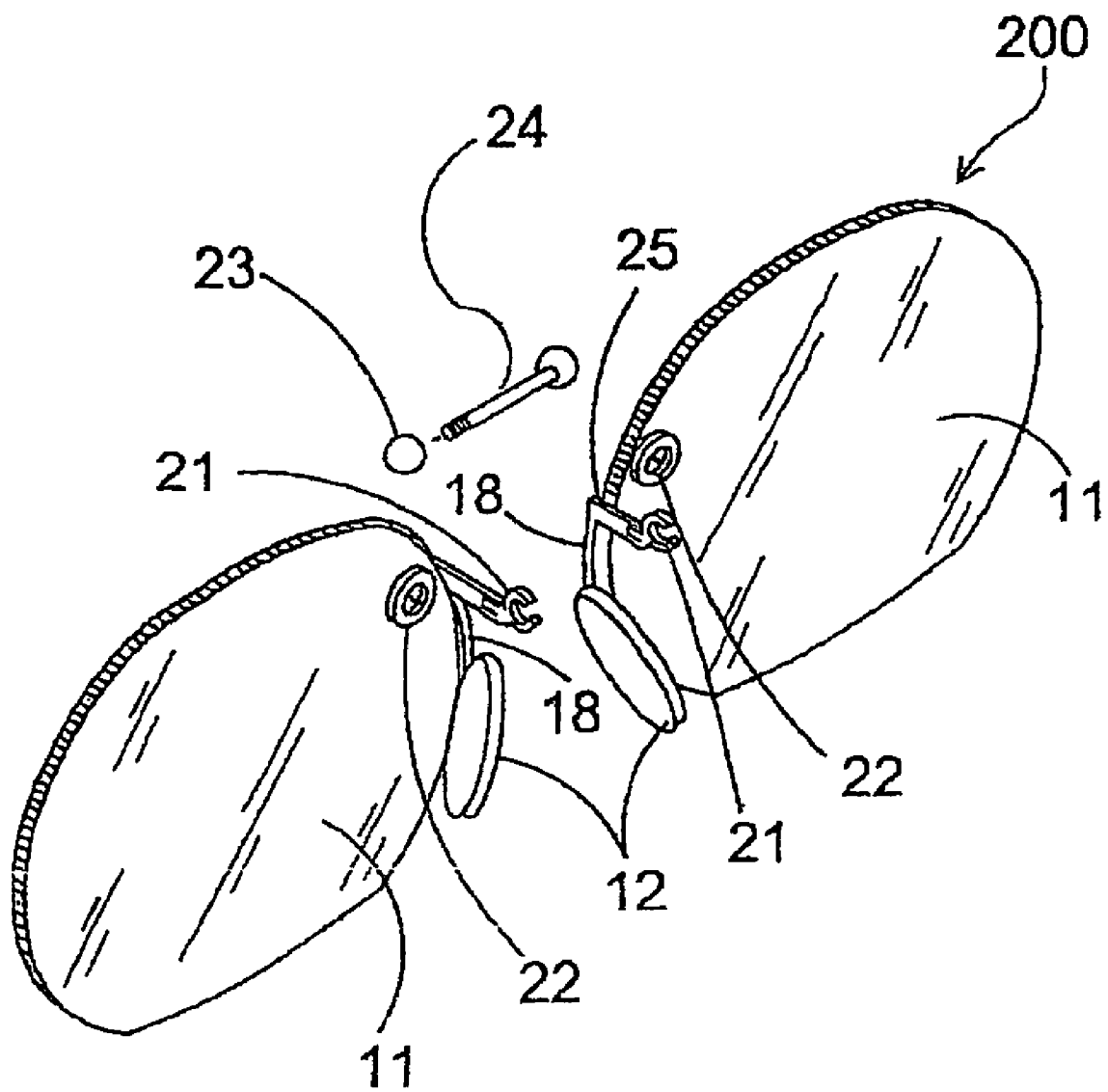
FIG. 7 is a top perspective view of the GNB design, an alternate embodiment of the present invention, for attachment to a pierced nose bridge stud.

FIG. 7 is a top perspective view of the GNB 200 design, an alternate embodiment of the present invention, for attachment to pierced nose bridge stud 24. Short bridge 25 contains two distal ends and a center point for attachment to lens 11. Flexible rubber C-clip 14 is fixedly attached to one distal end of short bridge 25. One distal end of each flexible rubber C-clip 14 is "C" shaped for attachment to pierced nose bridge stud 24. Short bridge 25 attaches to lens 11 via C-clip attach assembly 22, which consists of a threaded bolt, two washers 19, and a nut 21, and the other distal end of each short bridge 25, bridge extension arms 18, and accepts each nose rest 12. Also shown is nose stud 23, which holds pierced nose bridge stud 24 in place on user.

Figure 8:
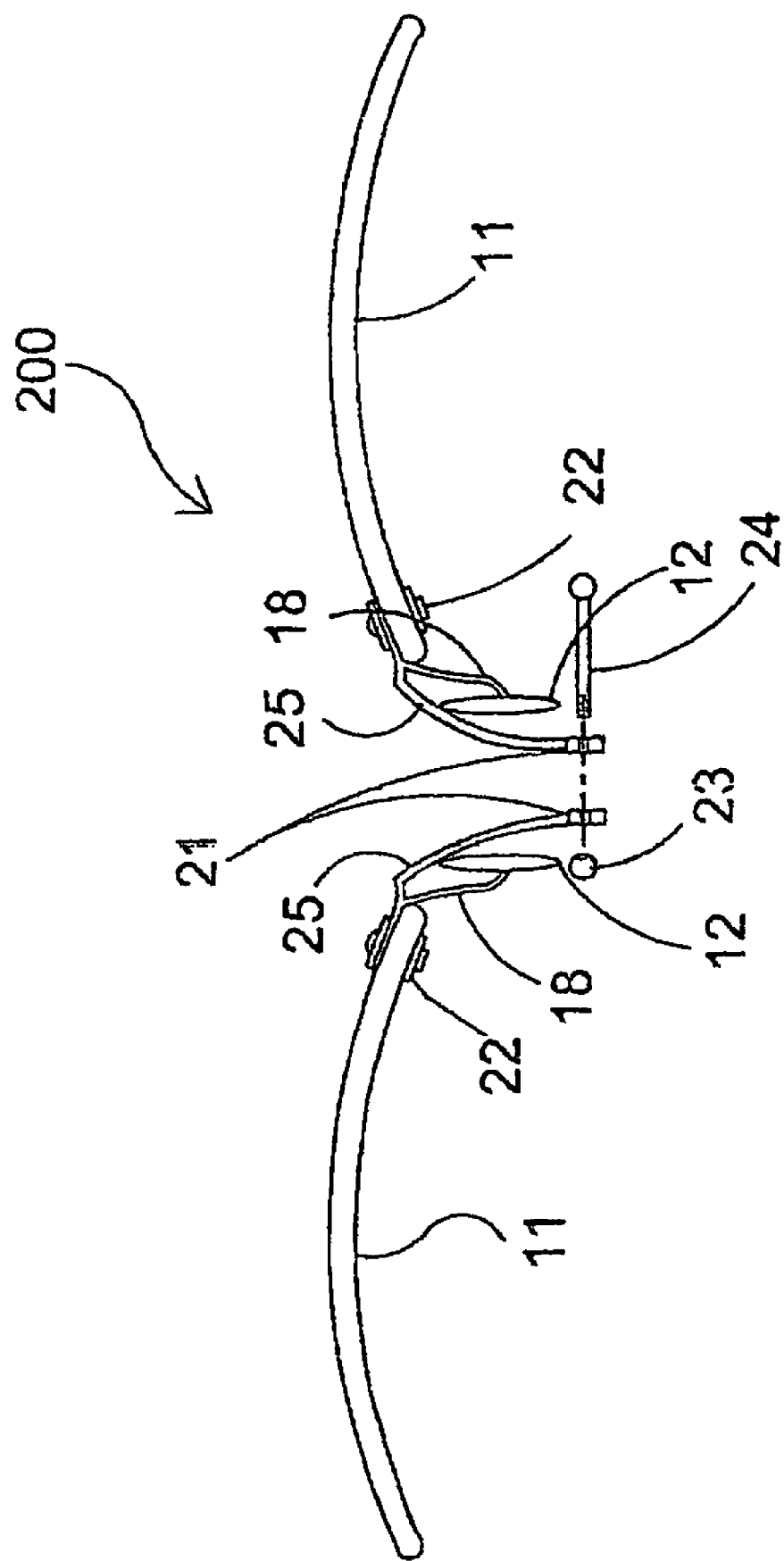
FIG. 8 is a top view of the GNB design, an alternate embodiment of the present invention, for attachment to a pierced nose bridge stud.

FIG. 8 is a top view of the GNB 200 design, an alternate embodiment of the present invention, for attachment to pierced nose bridge stud 24. Short bridge arm 25 contains two distal ends and a center point to attachment to lens 11. Flexible rubber C-clip 14 is fixedly attached to one distal end of short bridge 25. One distal end of each flexible rubber C-clip 14 is "C" shaped for attachment to pierced nose bridge stud 24, which consists of threaded bolt, two washers 19, and a nut 21, and the other distal end of each short bridge 25, bridge extension arms 18, accepts each nose rest 12. Also shown is nose stud screw 23, which holds pierced nose bridge stud 24 in place on user. It should be noted that C-clip attach assembly 22 could easily be replaced with another attachment mechanism, such as a rivet, compression clip, etc. in attaching each lens 11.

Figure 9:
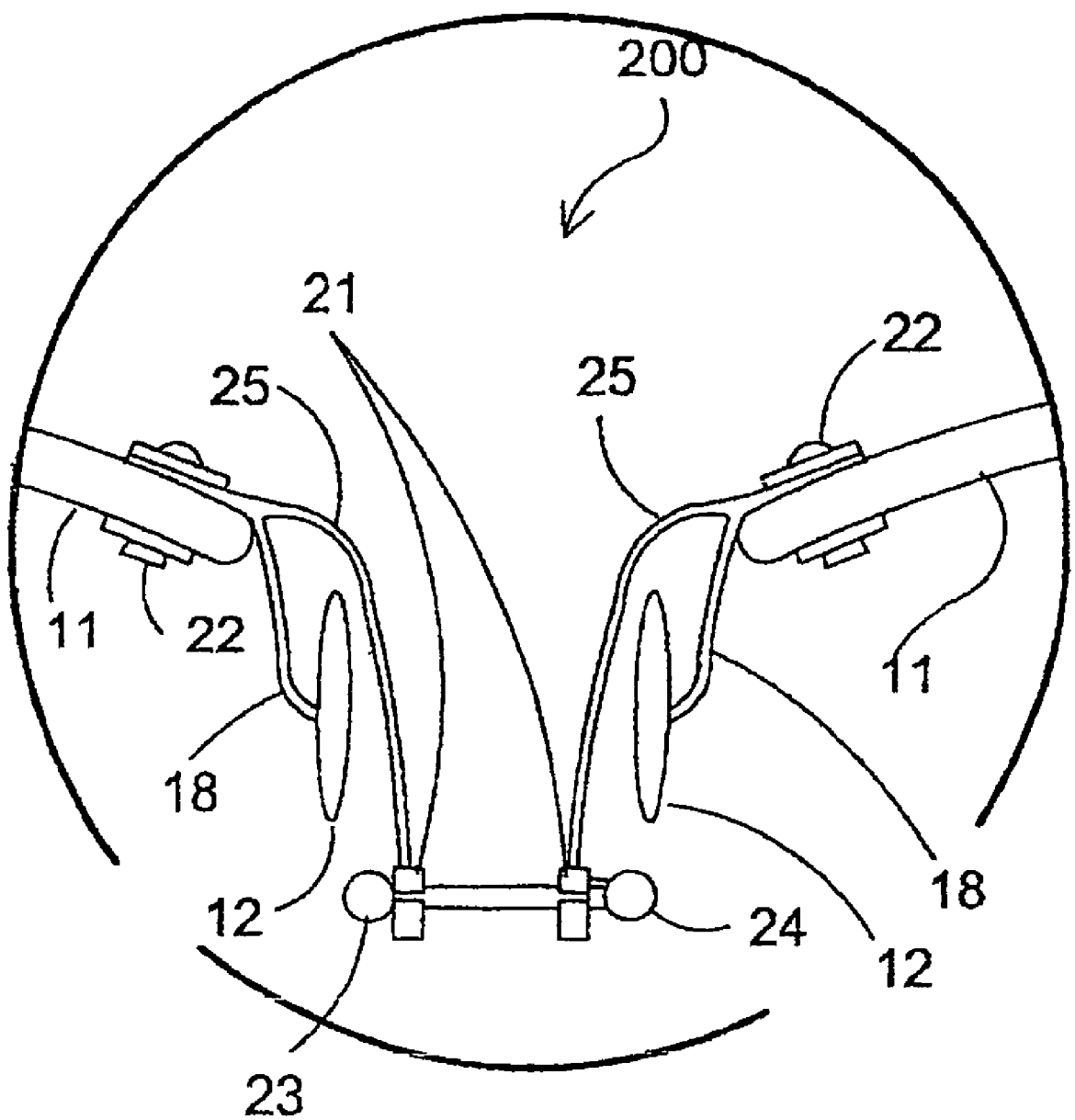
FIG. 9 is a detailed close up top view of the GNB design, an alternate embodiment of the present invention, for attachment to a pierced nose bridge stud.

FIG. 9 is a detailed close top view of the GNB 200 design, an alternate embodiment of the present invention, for attachment to pierced nose bridge stud 24. Each lens 11 attaches to each short bridge 25 by means of C-clip assembly 22. Flexible rubber C-clip 14 is fixedly attached to one distal end of short bridge 25 and nose rest 12 is attached to bridge extension arms 18 of short bridge 25. Flexible rubber C-clip 14 is "C" shaped for attachment to pierced nose bridge stud 24. Nose stud screw 23 hold holds pierced nose bridge stud 24 in place on a user. It should be noted that C-clip attach assembly 22 could easily be replaced with another design mechanism, such as a rivet, compression clip, etc. in attaching each lens 11.

Figure 10:
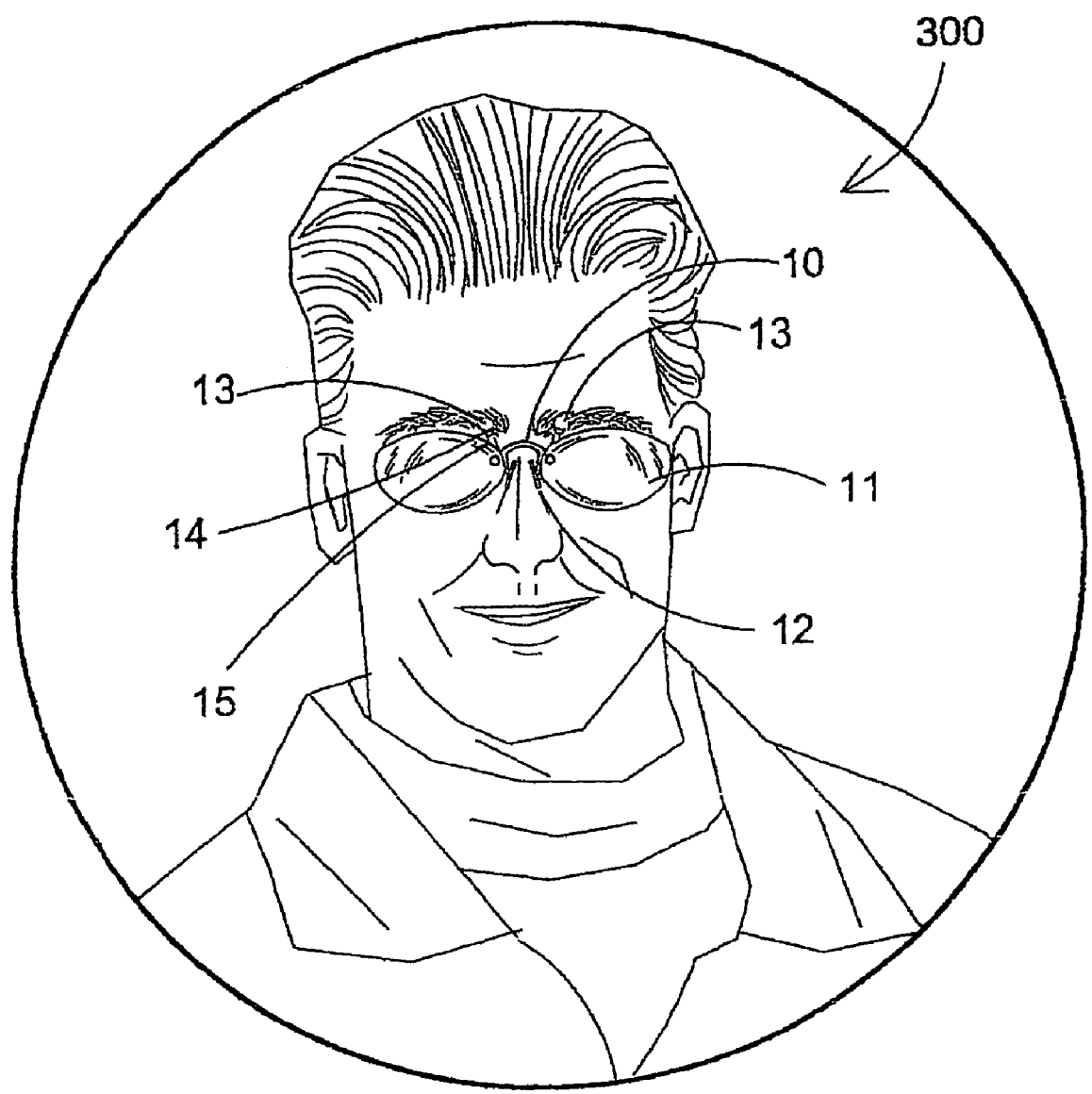
FIG. 10 is an alternative view of the glass to close eyebrow stud (GCES) design, an alternate embodiment of the GES design, shown in use and attached to eyebrow studs, which are closer to the center face.

FIG. 10 is an illustrative view of the GCES 300 design, an alternate embodiment of the GES 100 design, shown in use and attached to eyebrow studs 13, which are closer to the center face. In this glass to close eyebrow stud (GCES 300) design, all parts are common to GES 100 design shown previously. GCES 300 is designed for application where eyebrow studs 13 have been moved to the nose bridge area of a user. One important aspect of this alternate embodiment is that all parts are a subset of GES 100 design. Each lens 11 and metal arm 15 is attached to bridge 10 via a screw 20, washers 19, and nut 21 (or other means). Nose rests 12 are attached to leg extension of bridge 10 and supply comfort in user wear. It should be noted that the attachment by means other than a screw 20/nut 21 combination. For example, a rivet or other means could accomplish the same functional result. Flexible rubber clip insert 14 has an elastomeric C-shaped tip fixedly attached to one distal end for attachment to eyebrow stud 13. Further detail will be illustrated in FIG. 11. It should be noted that although FIG. 10 shows attachment to an eyebrow stud 13, this design could easily attach to a nose stud.

Figure 11:
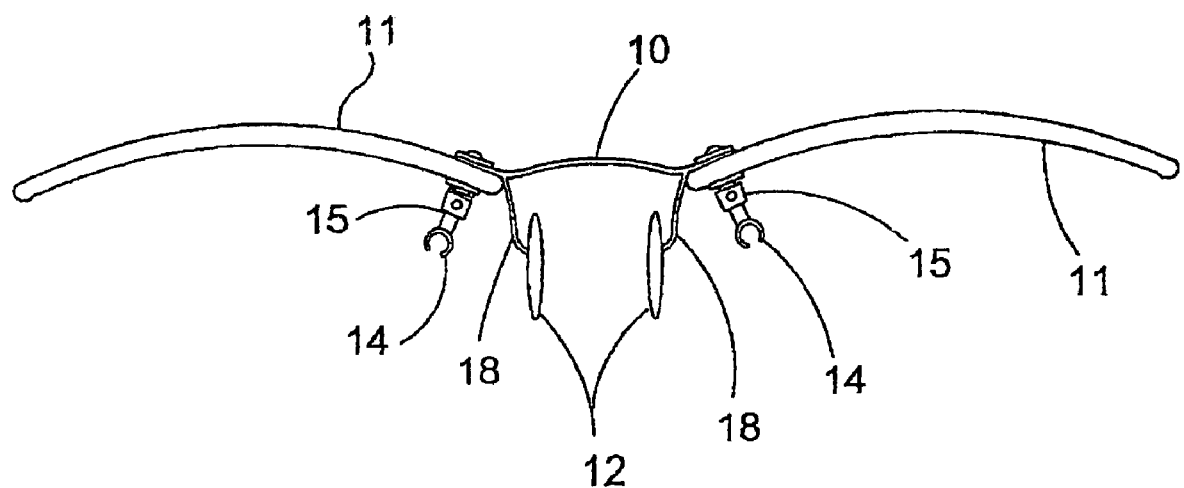
FIG. 11 is a top view of the GCES design, alternate embodiment of the GES design for attachment to dual eyebrow studs, which are closer to the center face.

FIG. 11 is a top view of the GCES 300 design, alternate embodiment of the GES 100 design for attachment to dual eyebrow studs which are closer to the center face. In this glass to close eyebrow stud (GCES 300) design, many parts are common to GES 100 design shown previously. GCED 300 is designed for application where eyebrow studs 13 have been moved to the nose bridge area of a user. One important aspect of this alternate embodiment is that all parts are a subset of GES 100 design. Each lens 11 and metal arm 15 is attached to bridge 10 via a screw 20, washers 19, and nut 21 (or other means). Nose rests 12 are attached to bridge extension arms 18 of bridge 10 and supply comfort to user wear. It should be notes that the attachment of metal arm 15 and bridge 10 to lens 11 could be accomplished by means other than a screw 20/nut 21 combination. For example, a rivet or other means could accomplish the same functional result. Flexible rubber clip insert 14 has an elastomeric C-shaped tip fixedly attached to one distal end for attachment to eyebrow stud 13.

What is claimed is:

1. In combination with a body piercing eyebrow studs, a left stud fastened outbound on a left eyebrow, and a right stud fastened outbound on a right eyebrow, an improvement comprising:
   A. a left eyeglass member having a first stud attachment member fastened to a section of the eyeglass member;
   B. a right eyeglass member having a second stud attachment member fastened to an outbound section of the eyeglass member;
   C. a connecting bridge joining the left to the right eyeglass member; and wherein each stud attachment member may fasten onto the respective left or right stud.

2. The improvement of claim 1, wherein each left and right eyeglass member has a nose rest.

3. In combination with a body piercing eyebrow studs, a left stud fastened adjacent to a left eyebrow, and a right stud fastened adjacent a right eyebrow, an improvement comprising:
   A. a left eyeglass member having a left fastener fastened to a left section of the eyeglass member;
   B. a right eyeglass member having a right fastener fastened to a right section of the eyeglass member;
   C. a connecting bridge joining the left to the right eyeglass member; and whereby each fastener mounts to the respective left or right stud.

4. The improvement of claims 3, wherein each of the left and right eyeglass members has a nose rest.

5. In combination with a body piercing nose bridge stud, an improvement comprising;
   A. a first stud anchored on an inbound portion of a left eyeglass member;
   B. a second stud anchored on an inbound portion of a right eyeglass member;
   wherein each stud mounts to a respective left or right of the nose bridge stud for support.

6. The improvement of claim 5, wherein the left and the right eyeglass members each have a nose rest.

7. An eyeglass support comprising:
   A. an eyeglass member;
   B. connector means for holding an eyeglass member to a body piercing member, said connector means functioning to removably attach the eyeglass member to the body piercing member; and
   C. anchor means for removably connecting the connector means to the eyeglass member.

* * * * *